(12) United States Patent
Hom et al.

(10) Patent No.: US 8,931,048 B2
(45) Date of Patent: Jan. 6, 2015

(54) DATA SYSTEM FORENSICS SYSTEM AND METHOD

(75) Inventors: Richard V. Hom, Troy, MI (US); David C. Roxin, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 12/862,030

(22) Filed: Aug. 24, 2010

(65) Prior Publication Data

US 2012/0054827 A1 Mar. 1, 2012

(51) Int. Cl.

| G06F 7/04 | (2006.01) |
|---|---|
| G06F 17/30 | (2006.01) |
| G06F 21/60 | (2013.01) |
| G06F 21/55 | (2013.01) |
| G06F 21/62 | (2013.01) |
| H04L 29/06 | (2006.01) |
| H04L 29/08 | (2006.01) |

(52) U.S. Cl.
CPC ........... *G06F 21/604* (2013.01); *H04L 67/1057* (2013.01); *H04L 29/08378* (2013.01); *G06F 21/552* (2013.01); *G06F 21/6218* (2013.01); *H04L 63/102* (2013.01); *G06F 2221/2101* (2013.01); *G06F 2221/2141* (2013.01)
USPC ................................................. 726/2; 726/10

(58) Field of Classification Search
CPC ....................... H04L 29/08378; H04L 67/1057
USPC ............................................................. 726/2
See application file for complete search history.

(56) References Cited

U.S. PATENT DOCUMENTS

| 6,615,253 | B1 | 9/2003 | Bowman-Amuah |
|---|---|---|---|
| 6,766,314 | B2 | 7/2004 | Burnett |
| 7,461,051 | B2 | 12/2008 | Lavine |
| 7,552,110 | B2 | 6/2009 | Hrle et al. |
| 7,568,097 | B2 | 7/2009 | Burnett |
| 7,698,255 | B2 | 4/2010 | Goodwin et al. |
| 7,698,303 | B2 | 4/2010 | Goodwin et al. |
| 7,870,203 | B2 | 1/2011 | Judge et al. |
| 7,937,480 | B2 | 5/2011 | Alperovitch et al. |
| 8,010,460 | B2 | 8/2011 | Work et al. |
| 8,021,163 | B2 | 9/2011 | Forman |
| 8,027,975 | B2 | 9/2011 | Gabriel et al. |
| 8,214,497 | B2 | 7/2012 | Alperovitch et al. |
| 2002/0147706 | A1 | 10/2002 | Burnett |

(Continued)

OTHER PUBLICATIONS

Pujol, J. M. et al., "Extracting Reputation in Multi Agent Systems by Means of Social Network Topology", Proceedings of the First International Joint Conference on Autonomous Agents and Multiagent Systems, Jul. 15-19, 2002, Bologna, Italy. Publisher: ACM Press, pp. 467-474.

(Continued)

*Primary Examiner* — Arvin Eskandarnia
(74) *Attorney, Agent, or Firm* — John Pivnichny; Maxine L. Barasch; Keohane & D'Alessandro, PLLC

(57) ABSTRACT

A system and method for creates, maintains and monitors individuals, organizations and artifacts relating to the same over time with respect to pedigree and reputation, security and reliability. One aspect of the present invention provides for a method and a system for collecting and maintaining historical party reputation data. Another aspect of the present invention provides for a method and a system for assessing an access decision to the historical party reputation data to a person after the person's reputation has changed.

15 Claims, 5 Drawing Sheets

(56) References Cited

U.S. PATENT DOCUMENTS

| | | |
|---|---|---|
| 2003/0083891 A1 | 5/2003 | Lang et al. |
| 2005/0005079 A1 | 1/2005 | Boudou et al. |
| 2005/0216300 A1 | 9/2005 | Appelman et al. |
| 2006/0212931 A1 | 9/2006 | Shull et al. |
| 2007/0006326 A1 | 1/2007 | Redlich et al. |
| 2007/0101436 A1 | 5/2007 | Redlich et al. |
| 2007/0255753 A1 | 11/2007 | Pomerantz |
| 2008/0005223 A1 | 1/2008 | Flake et al. |
| 2008/0141366 A1* | 6/2008 | Cross et al. ............ 726/21 |
| 2008/0175266 A1 | 7/2008 | Alperovitch et al. |
| 2008/0183538 A1 | 7/2008 | Hamadi et al. |
| 2008/0243933 A1 | 10/2008 | Holtzman et al. |
| 2008/0281807 A1 | 11/2008 | Bartlang et al. |
| 2009/0024489 A1 | 1/2009 | Baldua et al. |
| 2009/0024574 A1 | 1/2009 | Timmons |
| 2009/0187442 A1 | 7/2009 | Kohanim et al. |
| 2009/0204471 A1 | 8/2009 | Elenbaas et al. |
| 2009/0228294 A1 | 9/2009 | Choi et al. |
| 2009/0265551 A1 | 10/2009 | Tripunitara et al. |
| 2009/0300720 A1 | 12/2009 | Guo et al. |
| 2010/0005099 A1 | 1/2010 | Goodman et al. |
| 2010/0064362 A1 | 3/2010 | Materna et al. |
| 2010/0077445 A1 | 3/2010 | Schneider et al. |
| 2011/0185436 A1* | 7/2011 | Koulinitch et al. ....... 726/28 |
| 2011/0202551 A1 | 8/2011 | Agrawal |
| 2011/0214174 A1* | 9/2011 | Herzog et al. ........... 726/10 |
| 2011/0252483 A1* | 10/2011 | Cross et al. ............ 726/28 |
| 2012/0036127 A1 | 2/2012 | Work et al. |
| 2012/0124033 A1 | 5/2012 | Gabriel et al. |

OTHER PUBLICATIONS

U.S. Appl. No. 12/775,410, Office Action, Jul. 17, 2012, 46 pages.

Yang et al., "Integrating Dirichlet Reputation into Usage Control", CSHRW '09, Apr. 13-15, 2009, 14 pages.

Crampton et al., "Towards an Access-Control Framework for Countering Insider Threats", 2010, 23 pages.

Takabi et al., "Trust-Based User-Role Assignment in Role-Based Access Control", 2007 IEEE, 8 pages.

Windley et al., "Using Reputation to Augment Explicit Authorization", DIM '07, Sep. 2, 2007, 10 pages.

Artz et al., "A survey of trust in computer science and the Semantic Web", Journal of Web Semantics, Feb. 9, 2006, 14 pages.

Yuan et al., Attributed Based Access Control (ABAC) for Web Services, Proceedings of the IEEE International Conference on Web Services (ICWS '05), 2005, 9 pages.

Golbeck et al., "Accuracy of Metrics for Inferring Trust and Reputation in Semantic Web-Based Social Networks", 2004, Engineering Knowledge in the Age of Semantic Web, Springer-Verlag Berlin Heidelberg, pp. 116-131.

U.S. Appl. No. 12/775,410, Office Action, Nov. 15, 2013, 37 pages.
U.S. Appl. No. 12/775,410, Office Action, Dec. 31, 2012, 31 pages.
U.S. Appl. No. 12/775,410, Office Action, Feb. 28, 2014, 22 pages.
U.S. Appl. No. 12/815,431, Notice of Allowance, Sep. 17, 2012, 14 pages.

* cited by examiner

DATA SYSTEM FORENSICS SYSTEM AND METHOD

RELATED APPLICATIONS

The following applications, commonly-owned with this one, are related and hereby incorporated by reference in its entirety for all purposes: U.S. patent application Ser. No. 12/775,410, filed on May 6, 2010, entitled "Reputation Based Access Control"; U.S. patent application Ser. No. 12/815,431, filed on Jun. 16, 2010, entitled "Party Reputation Aggregation System And Method"; and U.S. patent application Ser. No. 12/897,062, filed on Oct. 24, 2010, entitled "Gathering, Storing and Using a Reputation System and Method".

FIELD OF THE INVENTION

One aspect of the present invention provides for a method and a system for collecting and maintaining historical party reputation data. Another aspect of the present invention provides for a method and a system for assessing an access decision to the historical party reputation data to a person after the person's reputation has changed.

BACKGROUND OF THE INVENTION

Many times, there is a need to assess the reputation, qualities or attributes of an individual or an organization such as a social networking organization. Some examples of times where it is desirable to assess an individual's or an organization's reputation, qualities or attributes may be when an individual or an organization is requesting physical access (e.g., to a building or a secured area within a building, to use a bulldozer or other power equipment, etc.) or electronic access (e.g., to a secured database or application on a server). For instance, it may be useful to understand the individual's skill level at a particular task, such as the individual's skill at operating a dangerous power tool or the individual's skill at programming in Java® programming language. Relevant information may include certifications received by the individual, peer reviews of the individual by his peers, an expert opinion of the individual's skill at that task, security level, the individual's activity history (e.g., as to whether the individual performed well in the past in a particular task), the individual's associations with organizations (e.g., programmers' user groups, social groups, social networking organizations, etc.) and individual's relationships with other individuals (e.g., father-son, attorney-client, friend-friend, etc.).

However, presently, this type of information may be dispersed across many different, possibly unconnected information stores. It is possible that present data systems, including such directory services as Lightweight Directory Access Protocol (LDAP)—like directory services, e.g., Microsoft® LDAP software or Microsoft Active Directory® software, do not maintain a history for an individual or an organization. Further, it may be that no history on artifacts is kept in many content management systems (CMSs) that integrate/interface with LDAP-like directory services. Further yet, there may be no mechanism for tracking an individual's or organization's pedigree/reputation/reliability/trustworthiness factors or one that has history for the same.

There is a problem in that there is a gap in maintaining an individual's or organization's history with respect to an enterprise's security model. In the case of an enterprise, individuals may enter and leave the enterprise over time. As such, security may be granted on a temporal basis only such that there may be a lack of historical recording that tells of an individual's security life cycle in the enterprise. Moreover, this gap may leave the individual's social network absent from the individual's security life cycle model at each interval that they are active in the enterprise. This may be important because, when an individual is determined to be "unreliable" for any reason, it may prove valuable to trace through any and all relationships that point to the source at any time, past and/or present, for finding "human security holes."

What is needed is a system and method for creating, maintaining and monitoring of individuals, organizations and artifacts relating to the same over time with respect to pedigree and reputation, security and reliability.

Therefore, there exists a need for a solution that solves at least one of the deficiencies of the related art.

SUMMARY OF THE INVENTION

The present invention may comprise a system and method for creating, maintaining and monitoring of individuals, organizations and artifacts relating to the same over time with respect to pedigree and reputation, security and reliability. Another aspect of the present invention provides for a method and a system for assessing an access decision to the historical party reputation data to a person after the person's reputation has changed.

It may further comprise a method for system security forensics in a system for allowing or denying a requester access to a protected asset comprising receiving a request to access the protected asset from a requester having a reputation, making a decision whether to allow or to deny the requester access to the protected asset based upon the requester's reputation, creating access decision data related to the access decision, and assessing the access decision data to determine why the access decision was made.

The present invention may further comprises a computer-readable medium storing computer instructions, which, when executed, enables a computer system operating with a reputation modification and decision making system, a reputation analyzer, a protected asset analyzer, and a protected asset access decision data assessor for system security forensics in a system for allowing or denying a requester access to a protected asset in a computer environment having hardware, the computer-readable medium storing computer instructions for performing a method comprising receiving a request to access a protected asset from a requester having a reputation, making a decision whether to allow or to deny the requester access to the protected asset based upon the requester's reputation, creating access decision data related to the access decision, and assessing the access decision data to determine why the access decision was made.

It may further comprise a method for deploying a reputation modification and decision making system having a reputation analyzer, a protected asset analyzer, and a protected asset access decision data assessor for system security forensics in a system for allowing or denying a requester access to a protected asset in a computer environment having hardware, for collecting and maintaining historical party reputation data and for assessing an access decision to the historical party reputation data to a person after the person's reputation has changed, the method comprising a process comprising receiving a request to access a protected asset from a requester having a reputation, making a decision whether to allow or to deny the requester access to the protected asset based upon the requester's reputation, creating and storing access decision data related to the access decision, and assessing the access decision data to determine why the access decision was made.

The present invention may further provide a reputation modification and decision making system comprising a reputation analyzer for determining whether the reputation of a requester to access a protected asset has changed, a protected asset analyzer for analyzing the access requirements of a requested protected asset, a risk assessor for assessing the risk of a requester to access a protected asset based upon the reputation of the requester and the access requirements of the requested protected asset, and a protected asset access decision maker for making a protected access decision based upon the risk assessment made by the risk assessor.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, provides a method and system for collecting and maintaining historical party reputation data. The method and system of the present invention further provides for assessing an access decision to the historical party reputation data to a person after the person's reputation has changed.

Many different data systems store, organize and provide access to data, such as those using the LDAP protocol. Lightweight Directory Access Protocol, or LDAP, is an application protocol for querying and modifying data using directory services running over TCP/IP. A directory service is simply the software system that stores, organizes and provides access to information in a directory. A directory is a set of objects with attributes organized in a logical and hierarchical manner. As an example, Microsoft Active Directory® software and technology is a technology created by Microsoft Corporation that provides a variety of network services, including LDAP-like directory services. There are other directory services software products and other protocols and these are noted as examples.

Figure 1:
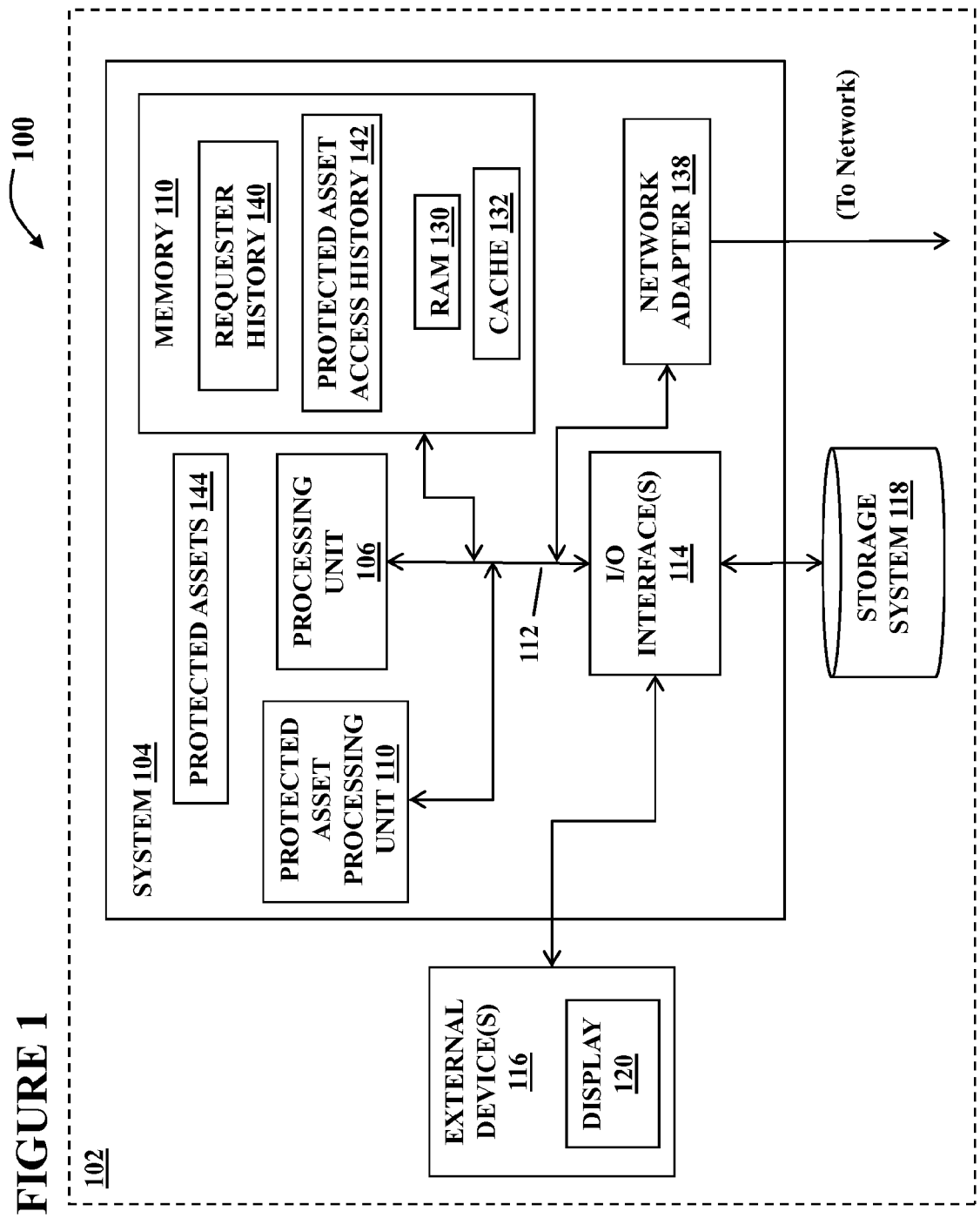
FIG. 1 shows a data processing system suitable for implementing an embodiment of a system for collecting and maintaining historical party reputation data and for assessing an access decision relating to the historical party reputation data to a person after the person's reputation has changed of the present invention.

A data processing system 100, such as data processing system 102 shown in FIG. 1, suitable for storing and/or executing program code of the present invention may include data system forensics system 104 having at least one processor (processing unit 106) coupled directly or indirectly to memory 110 through system bus 112. Memory 110 may include local memory (RAM 130) employed during actual execution of the program code and cache memories (cache 132) that provide temporary storage of at least some program code in order to reduce the number of times code must be retrieved from bulk storage 118, connected to data system forensics system 104, during execution. Memory 110 may further include requester history storage 140 for storing a history of a requester and protected asset access history storage 142 for storing the access history of protected assets. Protected assets 144 are those assets that have restricted access and are allowed access only to certain requesters, based upon the requesters' reputation, such as security clearance, etc.

Input/output or I/O devices (external peripherals 116) (including but not limited to keyboards, displays (display 120), pointing devices, etc.) can be coupled to data system forensics system 104 either directly or indirectly through a network (see FIG. 2) through intervening I/O controllers (I/O interface (s) 114). Data system forensics system 104 may also include protected asset processing unit 110 coupled to system bus 112. Requests or queries sent by protected asset processing unit 110 may be manually created by, such as, keying in a query on a keyboard (external peripheral(s) 114) and transmitting to data system forensics system 104 or, alternatively, may be automatically generated by a separate computer, e.g., and transmitting to data system forensics system 104.

Figure 2:
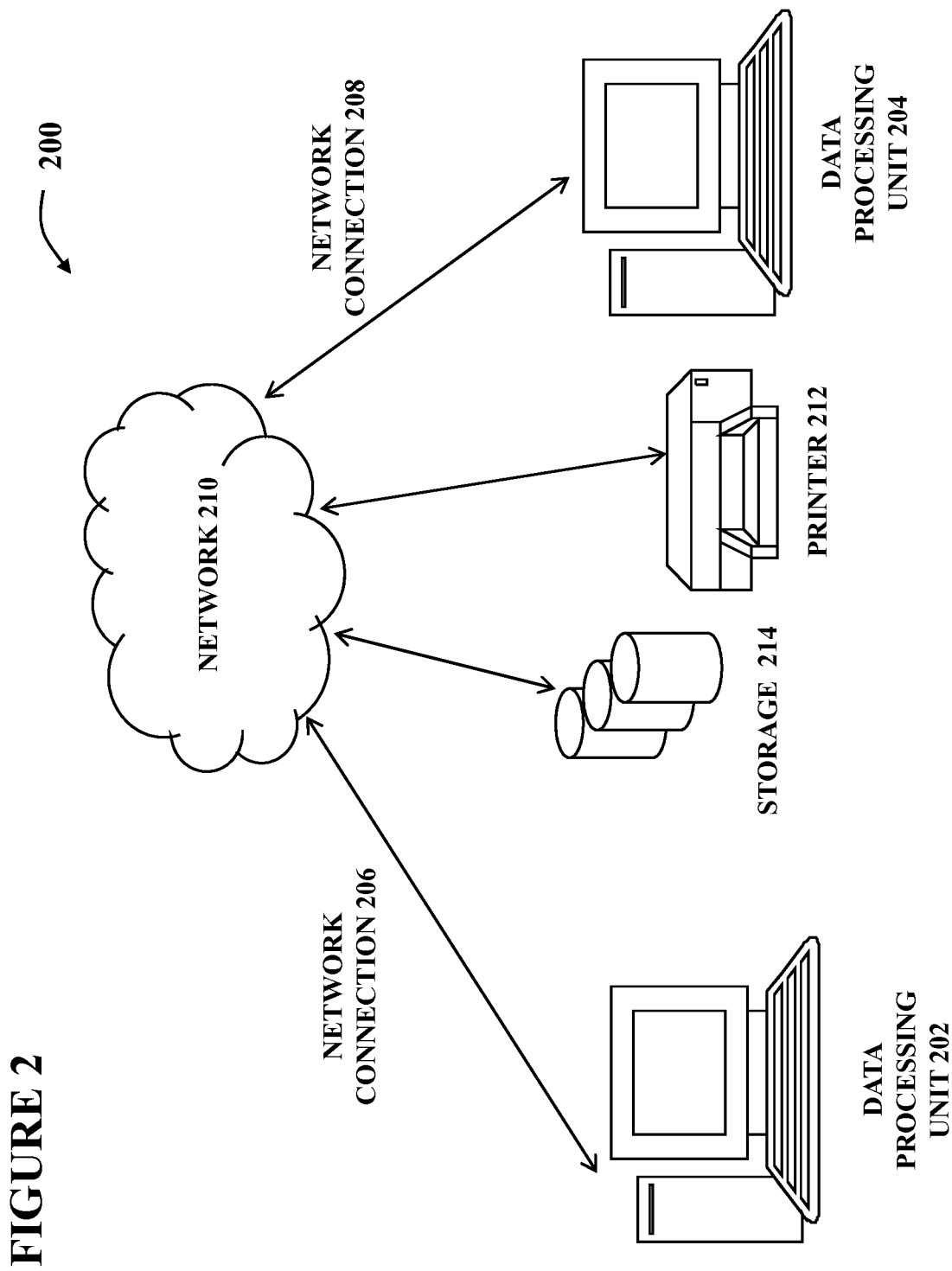
FIG. 2 shows a network that may incorporate an embodiment of the present invention.

Network adapters (network adapter 138 in FIG. 1) may also be utilized in system 200 to enable data processing units (as shown in FIG. 2, data processing unit 202) to become coupled through network connections (network connections 206, 208) to other data processing units (data processing unit 204), remote printers (printer 212) and/or storage devices (storage 214) or other devices through intervening private and/or public networks (network 210).

Figure 3:
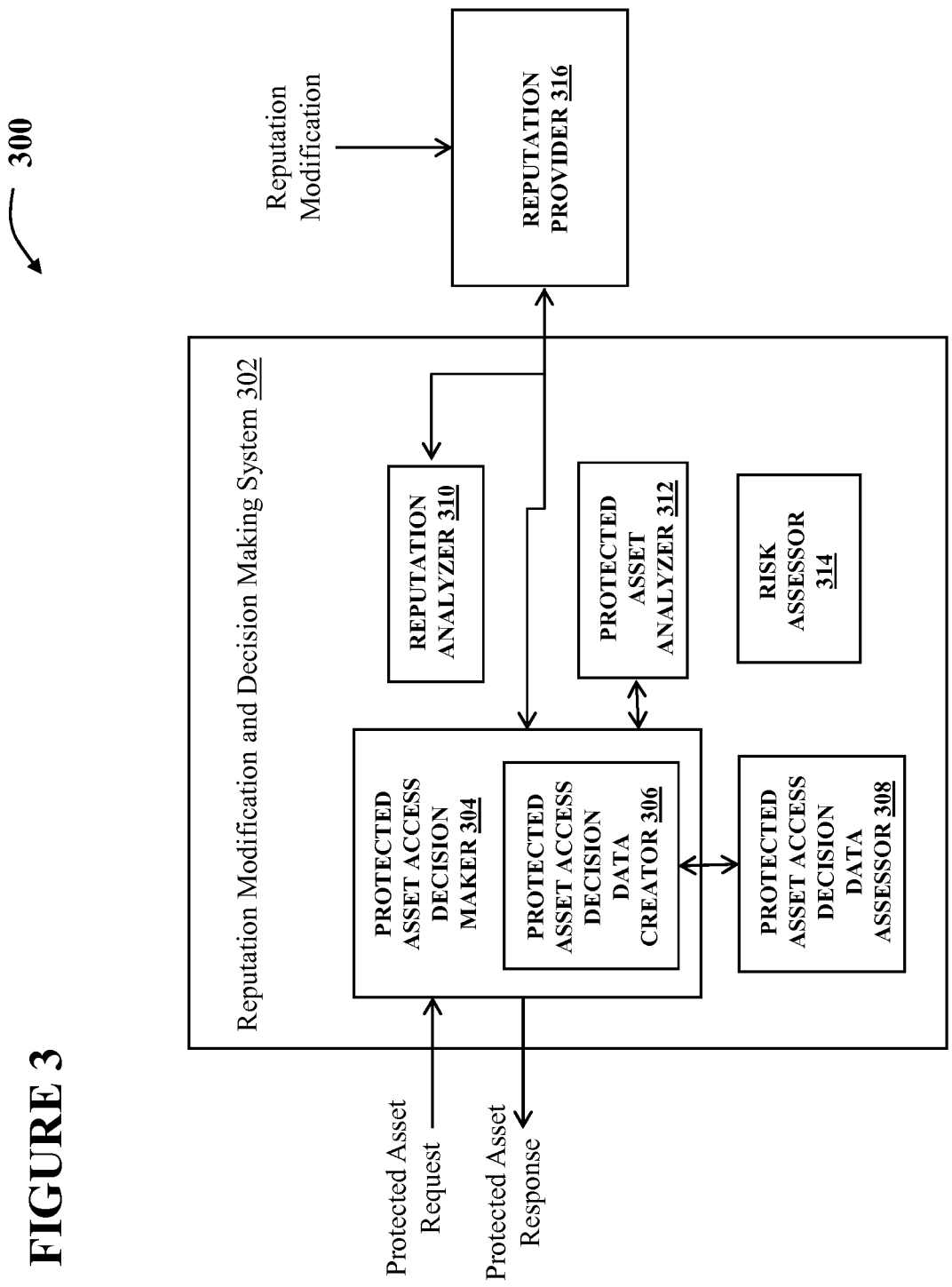
FIG. 3 illustrates a system of the present invention having a reputation modification and decision making system.

FIG. 3 illustrates system 300 having reputation modification and decision making system 302 that may include protected asset access decision maker 304 for receiving requests and providing responses to access protected assets 144 (FIG. 1) from requesters, each having a reputation that may be stored in reputation provider 316, such as a security clearance, associations with various organizations, whether the requestor's family members work for competitors, etc. Reputation providers are described in greater detail in the related applications detailed above in paragraph 1. Reputation provider 316 may receive reputation modifications when the reputation of a requester changes, such as when a requester associates with an organization, when a requester gets married to a person who works for a competitor, etc. Reputation analyzer 310 works with protected asset analyzer 312 to analyze the reputation of the requester as compared to the criteria to access the requested protected asset. Risk assessor 314 may be utilized to assess risk associated with the requester accessing the protected asset. Protected asset access decision maker 304 (also called a policy decision point or PDP) may make access decisions as to whether a particular requester who has requested access to a particular protected asset. Protected asset access decision maker 304 may utilize protected asset access data assessor 308 to determine whether a particular requester is entitled to access the requested protected asset. Protected asset access decision data creator 306 creates and stores access decision data representing the decision making process by protected asset access decision maker 304. This access decision data may be used by protected asset access decision data assessor 308 to assess the decision making process made by reputation modification and decision making system 302.

Figure 4:
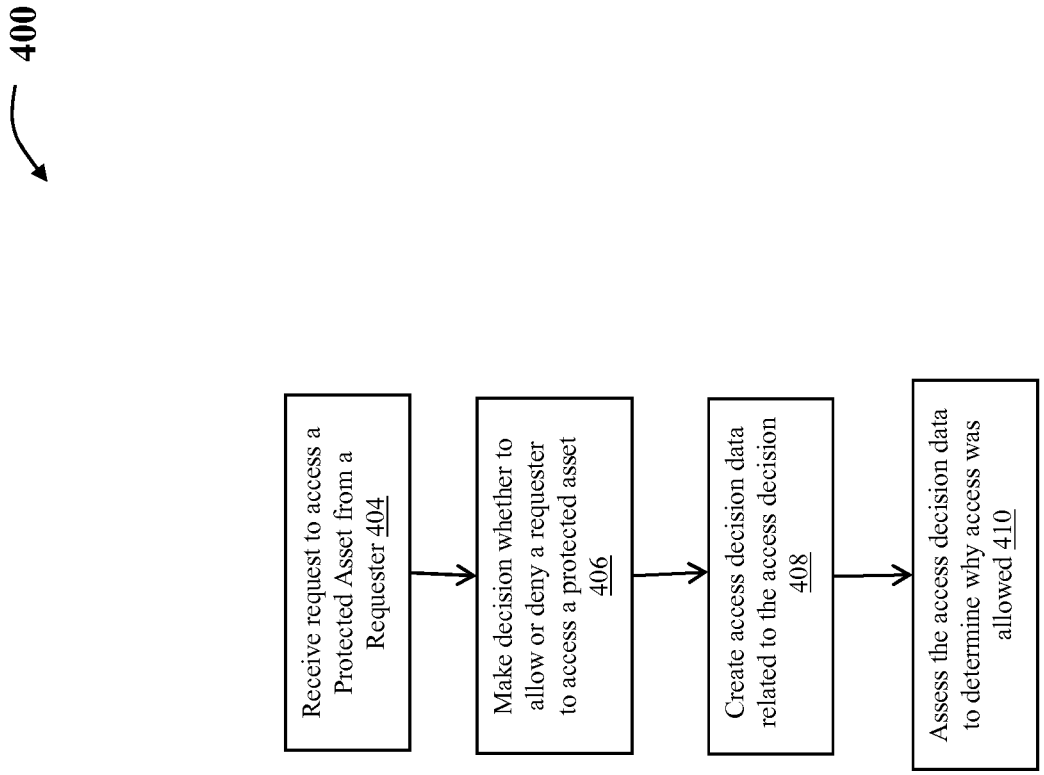
FIG. 4 illustrates an access decision data creation and assessment method of the present invention.

FIG. 4 illustrates an access decision data creation and assessment method 400 of the present invention, beginning at 404 where protected asset access decision maker 304 (FIG. 3) receives a request to access a protected asset from a requester. At 406, the requester's reputation is assessed by reputation analyzer 310 (FIG. 3) and the protected asset importance rating is analyzed by protected asset analyzer 312 (FIG. 3) to make decision whether to allow or deny a requester to access a protected asset. At 408, access decision data related to the access decision is created. The access decision data can be used to assess the access decision process by protected asset access decision data assessor 308 (FIG. 3). At 410, the access decision data may be assessed to determine why access was allowed by protected asset access decision data assessor 308 (FIG. 3).

Figure 5:
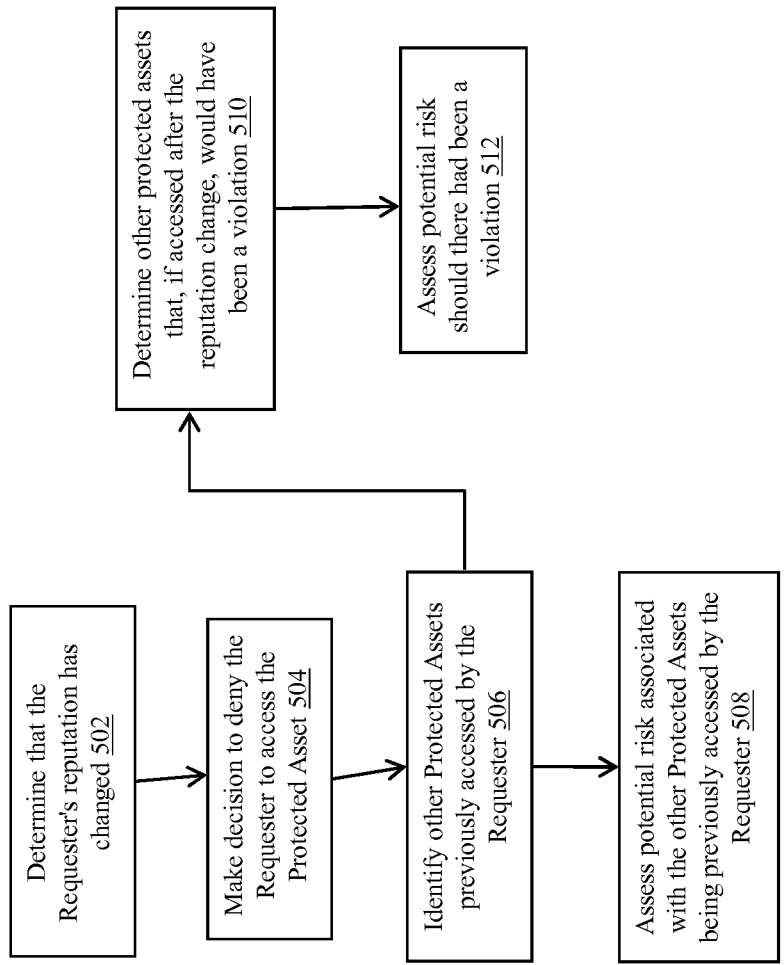
FIG. 5 illustrates a potential risk assessment of the present invention for assessing the potential risk of a requester accessing a protected asset after the requester's reputation has changed.

FIG. 5 illustrates a potential risk assessment 500 of the present invention. At 502, it is determined that the requester's reputation has changed and, at 504, a decision is made to deny the requester to access the protected asset. At 506, other protected assets previously accessed by the requester are identified. And at 508, other potential risks associated with the other protected assets being previously accessed by the requestor are assessed. At 510, it is determined whether other protected assets that, if accessed after the reputation change, would have been a violation. At 512, potential risk is assessed should there had been a violation.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for assessing an access decision to the historical party reputation data to a person after the person's reputation has changed, it is understood that the invention further provides various alternative embodiments. For example, in one embodiment, the invention provides a computer-readable/useable medium that includes computer program code to enable a system for assessing an access decision to the historical party reputation data to a person after the person's reputation has changed. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for assessing an access decision to the historical party reputation data to a person after the person's reputation has changed. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for assessing an access decision to the historical party reputation data to a person after the person's reputation has changed. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for system security forensics in a system for allowing or denying a requester access to a protected asset comprising:

receiving a request to access a protected asset from a requester having a reputation;

making a decision whether to allow or to deny the requester access to the protected asset based upon the requester's reputation;

creating access decision data related to the access decision;

assessing the access decision data to determine why the access decision was made;

determining that the requester's reputation has changed, and if the decision is to deny the requester to access the protected asset based on the change in reputation, identifying other protected assets previously accessed by the requester;

identifying potential risks associated with the other protected assets previously accessed by the requester; and determining whether there would be a violation of system security for the requester to access the other protected assets after the reputation change.

2. The method as defined in claim 1 further comprising assessing potential risk associated with the other protected assets being accessed by the requester after the requester's reputation has changed.

3. The method as defined in claim 1 further comprising determining other protected assets that, if accessed by the requester after the reputation change, would have been a violation.

4. The method as defined in claim 3 further comprising assessing potential risk should there had been a violation.

5. A non-transitory computer-readable storage medium storing computer instructions, which, when executed, enables a computer system operating with a reputation modification and decision making system, a reputation analyzer, a protected asset analyzer, and a protected asset access decision data assessor for system security forensics in a system for to allow or deny a requester access to a protected asset in a computer environment having hardware, the computer-readable medium storing computer instructions for performing a method comprising:
    receiving a request to access a protected asset from a requester having a reputation;
    making a decision whether to allow or to deny the requester access to the protected asset based upon the requester's reputation;
    creating access decision data related to the access decision;
    assessing the access decision data to determine why the access decision was made;
    determining that the requester's reputation has changed, and if the decision is to deny the requester to access the protected asset based on the change in reputation, identifying other protected assets previously accessed by the requester;
    identifying potential risks associated with the other protected assets previously accessed by the requester; and
    determining whether there would be a violation of system security for the requester to access the other protected assets after the reputation change.

6. The non-transitory computer-readable storage medium as defined in claim 5 wherein the method further comprises assessing potential risk associated with the other protected assets accessed by the requester after the requester's reputation has changed.

7. The non-transitory computer-readable storage medium as defined in claim 5 wherein the method further comprises determining other protected assets that, if accessed after the reputation change, would have been a violation.

8. The non-transitory computer-readable storage medium as defined in claim 7 wherein the method further comprises assessing potential risk should there had been a violation.

9. A method for deploying a reputation modification and decision making system having a reputation analyzer, a protected asset analyzer, and a protected asset access decision data assessor for system security forensics in a system for allowing or denying a requester access to a protected asset in a computer environment having hardware, for collecting and maintaining historical party reputation data and for assessing an access decision to the historical party reputation data to a person after the person's reputation has changed, the method comprising a process comprising:
    receiving a request to access a protected asset from a requester having a reputation;
    making a decision whether to allow or to deny the requester access to the protected asset based upon the requester's reputation;
    creating and storing access decision data related to the access decision;
    assessing the access decision data to determine why the access decision was made;
    determining that the requester's reputation has changed, and if the decision is to deny the requester to access the protected asset based on the change in reputation, identifying other protected assets previously accessed by the requester;
    identifying potential risks associated with the other protected assets previously accessed by the requester; and
    determining whether there would be a violation of system security for the requester to access the other protected assets after the reputation change.

10. The method as defined in claim 9 wherein the process further comprises assessing potential risk associated with the other protected assets being accessed by the requester after the requester's reputation has changed.

11. The method as defined in claim 10 wherein the process further comprises determining other protected assets that, if accessed after the reputation change, would have been a violation.

12. The method as defined in claim 11 wherein the process further comprises assessing potential risk should there had been a violation.

13. A reputation modification and decision making system comprising:
    at least one processing unit;
    a memory operably associated with the at least one processing unit;
    a reputation analyzer storable in the memory and executable by the at least one processing unit, the reputation analyzer configured to determine whether the reputation of a requester to access a protected asset has changed and to identify other protected assets previously accessed by the requester;
    a protected asset analyzer storable in the memory and executable by the at least one processing unit, the protected asset analyzer configured to analyze the access requirements of a requested protected asset;
    a risk assessor storable in the memory and executable by the at least one processing unit, the risk assessor configured to assess the risk of a requester to access a protected asset based upon the reputation of the requester and the access requirements of the requested protected asset;
    a protected asset access decision maker storable in the memory and executable by the at least one processing unit, the protected asset access decision maker configured to make a protected access decision based upon the risk assessment made by the risk assessor;
    a protected asset data creator storable in the memory and executable by the at least one processing unit, the protected asset data creator configured to, in response to the making of the protected access decision by the asset access decision maker, create access decision data related to the protected access decision; and
    a protected asset access decision data assessor storable in the memory and executable by the at least one processing unit, the protected asset access decision data assessor configured to assess the access decision data to determine why the protected access decision was made;
    wherein the risk assessor is further configured to identify potential risks associated with the other protected assets previously accessed by the requester, and determine whether there would be a violation of system security for the requester to access the other protected assets after the reputation change.

14. The reputation modification and decision making system as defined in claim 13 further comprising a protected asset access decision data creator storable in the memory and executable by the at least one processing unit, the protected asset access decision data creator configured to create and store protected asset access decision data so that the access decision data may be analyzed to determine the logic as to the protected asset access decision.

15. The reputation modification and decision making system as defined in claim 14 further comprising a protected asset access decision data assessor storable in the memory and executable by the at least one processing unit, the protected asset access decision data assessor configured to assess protected asset access decision data to determine the logic as to the protected asset access decision.

* * * * *